United States Patent [19]

Yagi et al.

[11] 3,886,120

[45] May 27, 1975

[54] PROCESS FOR PREPARING AROMATIC POLYMER AND PRODUCT THEREOF

[75] Inventors: Norio Yagi; Hiroshi Okai; Makoto Fukuda; Ikuji Kishi, all of Tokyo, Japan

[73] Assignee: Denki Kagaku Kogyo Kabushiki Kaisha, Japan

[22] Filed: July 9, 1974

[21] Appl. No.: 486,810

[30] Foreign Application Priority Data
July 11, 1973 Japan.............................. 48-78142

[52] U.S. Cl........ 260/49; 260/30.8 DS; 260/33.8 R; 260/50; 260/61
[51] Int. Cl...................... C08g 23/00; C08g 25/00
[58] Field of Search................. 260/47 R, 49, 50, 61

[56] References Cited
UNITED STATES PATENTS

| | | | |
|---|---|---|---|
| 3,332,909 | 7/1967 | Farnham et al........................ | 260/47 |
| 3,723,389 | 3/1973 | Khattab................................ | 260/49 |

*Primary Examiner*—Lester L. Lee
*Attorney, Agent, or Firm*—Oblon, Fisher, Spivak, McClelland & Maier

[57] ABSTRACT

An aromatic polymer is prepared by bulk polymerizing a diphenolate compound, of a dialkali metal salt of a diphenol with a dihalodiphenyl compound, of a dihalogenobenzonoid compound containing an electron withdrawing group in at least one position ortho or para to the halogen atom, at 200°–400°C in the absence of a solvent.

7 Claims, No Drawings

PROCESS FOR PREPARING AROMATIC POLYMER AND PRODUCT THEREOF

BACKGROUND OF THE INVENTION

1. Field of the Invention

The present invention relates to a process for preparing an aromatic polymer having excellent heat resistance and thermal stability and improved color.

2. Description of the Prior Art

The preparation of a polyarylenepolyether with high heat resistance and good mechanical properties containing units having the formula $$-E-O-E'-O-$$

is known, wherein E represents a residual divalent phenol group and E' represents a residual benzonoid group having a weak electron withdrawing group in at least one of the positions ortho or para to the valence bonds. Both residual groups are bonded by aromatic carbon atoms to the oxygen by reacting a di-alkali metal salt of a diphenol with a dihalogenobenzonoid compound having an electron withdrawing group in at least one of the positions ortho or para to the halogen atom, in an anhydrous, inert polar solvent. (Japanese Pat. No. 7799/1967.)

The polymer prepared by this conventional process is transparent, but it has a brown color, so that the light-transmittance of the polymer is relatively low and the commercial value is low because of the appearance of the polymer. The polymer prepared by the conventional process disadvantageously undergoes thermal changes at a molding temperature higher than 300°C to form a gel, to break a part of the molecular chain or to abnormally increase in molecular weight. A need exists therefore for an aromatic polymer which is less colored than prior art polymers, and which can withstand high temperatures.

SUMMARY OF THE INVENTION

Accordingly, one object of the present invention is to provide a process for preparing a polymer having excellent heat resistance and thermal stability and improved color.

This object and other objects of the invention as will hereinafter become more readily understood can be attained by reacting a diphenolate compound having the formula

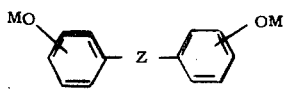

wherein M represents an alkali metal atom and Z represents $-SO_2-$, $-CO-$ or a $C_{1-5}$ alkylene group; and the $-OM$ group is ortho or para to Z; with a dihalodiphenyl compound having the formula

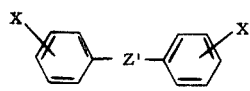

wherein X represents a halogen atom and Z' represents $-SO_2-$ or $-CO-$, and X is ortho or para to Z'. The reaction is a bulk polymerization in the absence of solvent at 200° - 400°C.

DETAILED DESCRIPTION OF THE PREFERRED EMBODIMENTS

The polymers prepared by the process of the present invention have excellent heat resistance, oxidation resistance and chemical resistance and are especially useful as raw materials for heat resistant paints and adhesive compositions. The polymers are also useful as high temperature heat transfer media. The high molecular weight polymers are especially important as thermoplastic polymers which have excellent mechanical strength and heat resistance, oxidation resistance and chemical resistance. For these applications, polymers with minimal color and excellent thermal stability are especially valuable.

The diphenolate compound (di-alkali metal salt of a diphenol compound) can be derived from compounds with a single nuclear phenylene group, such as hydroquinone, resorcinol, or the like, and compounds with a polynuclear phenylene group. It is especially preferable to use di-alkali metal salts of bisphenols, such as 2,2-bis-(4-hydroxyphenyl) propane, 2,4'-dihydroxydiphenylmethane, 3,3-bis-(4-hydroxyphenyl) pentane, 4,4'-dihydroxydiphenylsulfone, 2,4'-dihydroxydiphenylsulfone, 4,4'-dihydroxybenzophenone, 2,4'-dihydroxybenzophenone, 1,1-bis-(4-hydroxyphenyl) cyclohexane, 4,4'-dihydroxydiphenyl, 2,4'-dihydroxydiphenyl, or the like, are especially preferable. The alkali metal salt is preferably a sodium or potassium salt, which are the most economical.

The diphenolate compound is prepared by dissolving a diphenol in an aqueous solution of an equivalent amount of an alkali metal hydroxide. Solid diphenolate is prepared by concentrating and drying the aqueous solution. The diphenolate may be prepared by other conventional processes.

The dihalodiphenyl compound has two halogen atoms bonded to the benzene rings and an electron withdrawing group in at least one of the positions ortho or para to the halogen atoms. The halogen atom is preferably chlorine, which is highly reactive and economical. The purpose of the electron withdrawing group is to activate the halogen atom ortho or para to the electron withdrawing group, thereby promoting the condensation reaction of the dihalodiphenyl compound with the diphenolate compound with elimination of an alkali metal halide.

Suitable dihalodiphenyl compounds include 4,4'-dichlorodiphenylsulfone, 2,4'-dichlorodiphenylsulfone, 4,4'-dichlorobenzophenone, 2,4'-dichlorobenzophenone, or the like. A mixture of diphenolate compounds and a mixture of dihalodiphenyl compounds may be used. Accordingly, the residual group E' and the residual group E in the polymer are not always the same, but may differ depending upon the starting compounds.

The condensation reaction may be carried out by reacting the diphenolate compound with the dihalodiphenyl compound preferably in equimolar amounts, at 200°–400°C in the absence of a solvent, by dealkylimetalhalogenation (bulk polymerization.) The reaction velocity is too low at temperatures lower than 200°C, and thermal degradation of the polymer occurs at temperatures higher than 400°C. The dialkalimetal diphenolate compound is reacted with the dihalodiphenyl compound preferably in the molar ratio of 2/1–1/2. To prepare a polymer with a degree of condensation greater than about 50, which has high mechanical strength, the starting materials are preferably reacted in a molar ratio of about 1/1. Thus, by using an excess of one component the degree of condensation may be controlled.

When an excess of the dialkalimetal diphenolate is used, the thermal stability of the polymer will be slightly decreased, but the polycondensation velocity will be improved. When an excess of the dihalodiphenyl compound is used, the polycondensation velocity will not be improved, but the thermal stability of the polymer will be high.

In order to improve the contact of the starting materials, the diphenolate compound, which has a higher melting point, is preferably added in the form of fine particles which have a high surface area. For example, a mixture of fine particles can be obtained by grinding a mixture of the diphenolate compound and the dihalodiphenyl compound in a grinding vessel. Since the dihalodiphenyl compound is easily vaporized at the reaction temperature, the reactor is preferably a closed reactor and the temperature of the inner wall of the reactor is kept higher than the melting point of the dihalodiphenyl compound in order to prevent condensation or crystallization of the vaporized dihalodiphenyl compound on the wall. Stirring or kneading is preferably continued in the reaction system during the reaction, in order to perform the reaction quickly. Since the starting materials are easily oxidized, the reaction is preferably initiated in a vacuum or in an inert gas atmosphere, such as nitrogen, helium, or the like.

The alkali metal halide formed in the polycondensation can be removed by extracting the resulting polymer with water, or by dissolving the resulting polymer in a polar organic solvent such as dimethyl sulfoxide, chloroform, tetrachloroethane, or the like, and extracting with a solvent which will not dissolve the polymer but which is miscible with the polar solvent such as water, acetone, methanol, or the like, to precipitate the polymer, which is then washed with water. In the following examples, the temperature which initiated weight loss was measured by a differential thermal balance (manufactured by Rigaku Denki K.K.) under the conditions of rate of temperature increase of 10°C/min. and air flow velocity of 150 cc/min. The polymer sample was heated at 320°C for 2 hours in a hot press and the change of $\eta$ inh and the weight percent of gel formation during heat treatment were measured in order to evaluate the thermal stability. In the examples, viscosity $\eta$ inh is given by the equation $$\eta \text{ inh} = \frac{1}{c} \cdot \log_e \frac{ts - to}{to}$$

wherein
ts: efflux time of polymer solution;
to: efflux time of solvent;
C: concentration of polymer solution (g/100 ml).
The viscosity was measured at 30°C using 1,1, 2,2-tetrachloroethane as a solvent in an Ubbelohde viscometer. The concentration of the polymer solution was 0.5g/100ml. The color degree of the polymer was obtained by measuring the transmittance of visible light of 400–800 m$\mu$ at intervals of 50 m$\mu$ through a transparent sample plate having a thickness of 1 mm, and then calculating the average transmittance.

Having generally described the invention, a more complete understanding can be obtained by reference to certain specific examples, which are included for purposes of illustration only and are not intended to be limiting unless otherwise specified.

EXAMPLE 1

In a mortar, 15.67g (0.05 mole) of the 4,4'-dipotassium salt of dihydroxydiphenylsulfone and 14.36 g (0.05 mole) of 4,4'-dichlorophenylsulfone were mixed and ground to obtain a mixture of fine particles. The mixure was placed in a hard glass separable flask having a diameter of 28 mm, equipped with a stainless steel stirrer and a nitrogen gas inlet with ground glass closure. The flask was purged with nitrogen by repeated flushing with nitrogen, and was heated in an electric furnace. The mixture was heated at 200°C for 10 hours with stirring and then at 250°C for 15 hours with stirring. The stirring was stopped and the mixture was kept at 290°C for 10 hours. After cooling, the bottom of the flask was broken to remove the reaction mixture, which was dissolved in tetrachloroethane with heating. Methylchloride was then added at 140°C to inactivate the terminal groups, and the solution was cooled, filtered and poured into methanol to precipitate the polymer. The precipitated polymer was washed with water and was dried at 100°C under vacuum for one day. According to the infrared spectral analysis and NMR analysis, the polymer contained units having the formula

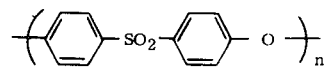

The polymer had a viscosity $\eta$ inh of 0.460 (condensation degree about 90), and the polymer heated at 320°C for 2 hours gave a viscosity $\eta$ inh of 0.464, and had no gel component. The temperature which initiated weight loss was 450°C, and the average transmittance was 87%.

Reference

A 250 ml separable flask equipped with a stirrer, thermometer, water cooled condenser and a water trap was charged with 12.52 g (0.05 mole) of 4,4'-dihydroxydiphenylsulfone, 12.5 ml of 8N aqueous KOH solution (KOH 0.1 mole), 75 ml of freshly distilled tetrahydrothiophene-1,1-dioxide(sulfolane) and 50 ml of xylene, in a nitrogen atmosphere, and the flask was purged with nitrogen. The mixture was refluxed for 4 hours and the water in the reaction system was removed as an azeotropic mixture of xylene, to prepare the dipotassium salt of 4,4'-dihydroxydiphenylsulfone in an anhydrous mixture of sulfolane and xylene. The solution was cooled at 45°C, and 14.36 g (0.05 mole) of 4,4'-dichlorodiphenylsulfone was added to the solution in a nitrogen atmosphere. The reaction mixture was heated to 240°C with stirring. Most of the xylene was removed, until the temperature of the reaction mixture reached 170°C. The reaction mixture was kept at 240°C for 3:75 hours and was cooled to 160°C. A small amount of methylchloride was added to inactivate the terminal groups. The reaction mixture was cooled to 50°C and was precipitated in 2 liters of ethanol. The precipitated polymer was washed with water and was dried at 100°C in a vacuum drier for one day. According to the infrared spectral analysis and NMR analysis, the polymer had the same structure as that of Example 1. The polymer had a viscosity $\eta$ inh of 0.47 (condensation degree about 100). However, the polymer had a brown color and an average transmittance of 46%. The polymer heated at 320°C for 2 hours had a viscosity $\eta$ inh of 0.62 and had a 45% gel component.

EXAMPLE 2

The process of Example 1 was repeated except that 15.22 g (0.05 mole) of the dipotassium salt of 2,2-bis-(4-hydroxyphenyl) propane was reacted with 14.36 g (0.05 mole) of 4,4'-dichlorodipheylsulfone with heating at 200°C for 8 hours and then at 230°C for 4 hours with stirring. The polymer prepared as in Example 1 had units having the formula

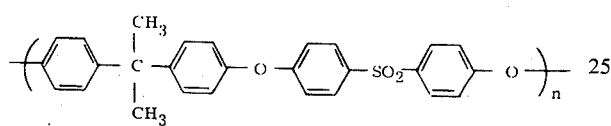

The polymer had a viscosity $\eta$ inh of 0.203 and the polymer heated at 320°C for 2 hours had a viscosity $\eta$ inh of 0.206 and had no gel component. The temperature initiating weight loss was 390°C and the material had a pale color.

EXAMPLE 3

The process of Example 1 was repeated except that 13.94 g (0.05 mole) of the dipotassium salt of 4,4'-dihydroxybenzophenone was reacted with 14.36 g (0.05 mole) of 4,4'-dichlorodiphenylsulfone with heating at 200°C for 4 hours, at 240°C for 10 hours with stirring, and at 290°C for 5 hours without stirring. The polymer prepared as in Example 1 had units having the formula

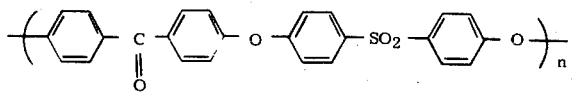

The polymer had a viscosity $\eta$ inh of 0.253 and the polymer heated at 320°C for 2 hours had a viscosity $\eta$ inh of 0.252 and had no gel component. The temperature initiating weight loss was 405°C, and the material had a pale color.

EXAMPLE 4

The process of Example 1 was repeated except that 15.67 g (0.05 mole) of the dipotassium salt of 4,4'-dihydroxydiphenylsulfone was reacted with 12.06 g (0.05 mole) of 2,4'-dichlorobenzophenone with heating at 200°C for 4 hours, at 250°C for 10 hours with stirring, and at 290°C for 5 hours without stirring. The polymer prepared as in Example 1 had units having the formula

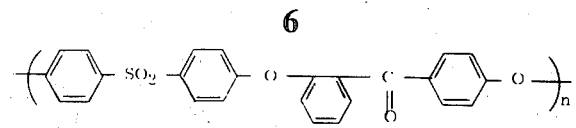

The polymer had a viscosity $\eta$ inh of 0.216 and the polymer heated at 320°C for 2 hours had a viscosity $\eta$ inh of 0.210 and had no gel component. The temperature initiating weight loss was 397°C, and the material had a pale color.

EXAMPLE 5

The process of Example 1 was repeated except that 14.71 g (0.05 mole) of the dipotassium salt of 4,4'-dihydroxydiphenylsulfone was reacted with 14.36 g (0.05 mole) of 4,4'-dichlorodiphenylsulfone with heating at 200°C for 4 hours, at 260°C for 6 hours with stirring, and at 280°C for 10 hours without stirring. The polymer prepared as in Example 1 had units having the formula

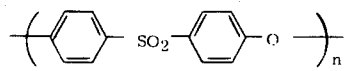

The polymer had a viscosity $\eta$ inh of 0.384, and the polymer heated at 320°C for 2 hours had a viscosity $\eta$ inh of 0.385 and had no gel component. The temperature initiating weight loss was 450°C, and the average transmittance was 85%.

Having now fully described the invention, it will be apparent to one of ordinary skill in the art that many changes and modifications can be made thereto without departing from the spirit or scope of the invention as set forth herein.

What is claimed as new and intended to be covered by Letters Patent of the United States is:

1. A process for preparing an aromatic polymer which comprises bulk polymerizing a dialkali metal salt of a diphenol with a dihalogenobenzenoid compound containing an electron withdrawing group in at least one position ortho or para to the halogen atom at 200°–400°C in the absence of a solvent, wherein said dialkali metal salt of the diphenol and said dihalogenobenzenoid compound are polycondensed in the molar ratio range of 2/1 to 1/2.

2. A process for preparing an aromatic polymer which comprises: bulk polymerizing a diphenolate compound having the formula

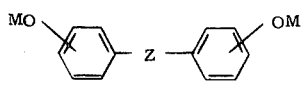

wherein M represents an alkali metal atom and Z represents —$SO_2$—, —CO— or a $C_{1-5}$ alkylene group, and the —OM group is ortho or para to Z with a dihalodiphenyl compound having the formula

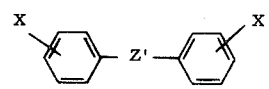

wherein X represents a halogen atom and Z' represent —$SO_2$— or —CO—, and X is ortho or para to Z'; a 200°–400°C in the absence of a solvent.

3. The process of claim 1, wherein the diphenolate compound is the sodium or potassium salt of diphenol containing a single or polynuclear phenylene group.

4. The process of claim 1, wherein the diphenolate compound is the sodium or potassium salt of bisphenol.

5. The process of claim 1, wherein the dihalodiphenyl compound is 4,4'- or 2,4'-dichlorodiphenylsulfone, or 4,4'- or 2,4'-dichlorobenzophenone.

6. The process of claim 1, wherein the diphenolate compound and the dihalodiphenyl compound are polycondensed in about an equimolar ratio without a solvent.

7. An aromatic polymer is prepared by a process which comprises bulk polymerizing a dialkali metal salt of a diphenol with a dihalogenobenzenoid compound containing an electron withdrawing group in at least one position ortho or para to the halogen atom, at 200°–400°C in the absence of a solvent, wherein said dialkali metal salt of the diphenol and the dihalogenobenzenoid compound are polycondensed in the molar ratio of 2/1 to 1/2.

* * * * *